United States Patent [19]

Arakaki

[11] Patent Number: 4,921,220
[45] Date of Patent: May 1, 1990

[54] METAL GRID PERIMETER OBSTACLE TRAP

[76] Inventor: Steven Arakaki, 927 Laki Road, Honolulu, Hi. 96817

[21] Appl. No.: 343,416

[22] Filed: Apr. 26, 1989

[51] Int. Cl.$^5$ .......................................... E04H 17/00
[52] U.S. Cl. ........................................ 256/1; 256/14; 256/DIG. 2
[58] Field of Search ............... 256/1, DIG. 2, 14, 11, 256/12.5, 17, 12

[56] References Cited

U.S. PATENT DOCUMENTS 1,778,629 10/1930 Elam .................................. 256/11 X
2,535,795 12/1950 Henningsen ......................... 256/17

FOREIGN PATENT DOCUMENTS 411945 8/1945 Italy ........................................ 256/1
261873 12/1926 United Kingdom .................. 256/14

Primary Examiner—Andrew V. Kundrat
Attorney, Agent, or Firm—James Creighton Wray

[57] ABSTRACT

A continuous elongated trench is provided around a prison or military fortification. Parallel plates are provided on opposite side walls. Anti-personnel wires such as razor or barbed wire in concertina form are placed in the bottom or the trench. A light grid with large openings and weakened portions is placed over the trench and is supported on the plates. Anti-personnel explosives in the bottom of the trench and suspended within the trench beneath the grid deter crossing of the trench by persons, vehicles or objects. A covering over the grid blends the trench into the surrounding area.

16 Claims, 1 Drawing Sheet

METAL GRID PERIMETER OBSTACLE TRAP

BACKGROUND OF THE INVENTION

The most common obstacle used to prevent passage by persons, animals or machines is a fence. Different fences are used for different purposes. When denying passage to humans, the conventional form of fence is a high chain-link fence. When denying passage is particularly important, barbed wire is added to the top of the fence. In cases of more important denied passage, the barbed wire may be replaced by razor wire. Loosely coiled concertina wire may be used in place of stretched strands to further create a bar to human passage. When it is extremely important that passage be denied, two or more fences are imposed. As an additional obstacle, the fences may be electrified.

Fences as a means of preventing human passage have one outstanding common feature. The fences are ugly and disfiguring of the landscape.

The disfigurement and ugliness of fences is particularly important when considering psychological impact on people living outside the fences, as well as people living inside the fences.

Social factors and changes in patterns of crime require more prisons. There is little space to devote to prisons. There may be reluctance to build prisons in view of the ugly nature of the necessary fences, as well as the ineffectiveness of conventional fences.

Military bases require anti-personnel fences. The existence of some particular type of fences often unintentionally reveals the secrecy or importance or nature of the location.

Conventional fences have one common disadvantage, which is the susceptibility of the fences to defeat by wire cutters. After cutting wires of a fence, one simply walks through where the fences have been, walking beneath the stranded or concertina form of anti-personnel wire on top of the fences and effectively defeating much of the added material of the fences.

Another common problem is that fences may be scaled. Throwing a coat or canvas across the barbed or razor wire at the top, one simply climbs a fence and drops down on the other side.

A need exists for better fences to surround prisons and military fortifications and the like.

SUMMARY OF THE INVENTION

The present invention overcomes and avoids problems of prior art and provides new horizontal-type fences for prisons and military installations and the like. The fences of the present invention are neither ugly, nor are they susceptible to defeat with simple measures.

A continuous elongated trench is provided around a prison or military fortification. Anti-personnel wires such as razor or barbed wire in concertina form are placed in the bottom of the trench.

A light grid with large openings is placed over the trench. Anti-personnel explosives in the bottom of the trench and suspended within the trench beneath the grid deter crossing of the trench by persons, vehicles or objects. A covering over the grid blends the trench into the surrounding area.

This device is designed to prevent, discourage, or impede human movement from one area to another.

The device is intended for use about prisons or military fortifications.

The device consists of a metal grid with metal plates at both ends for support, and razor or barbed wire at the bottom. The metal grid has square openings about 3 feet by 3 feet. The distance between the metal grid and the razor or barbed wire is about 3 to 5 feet.

The grid works in the following manner. When a man is about to cross the grid, the large openings make it difficult to maintain one's balance. Should the man fall into the trench he will get cut by the razor or barbed wire. If the man should fall on top of one of the metal bars, he would have a difficult time getting back up.

Further enhancements can be used to make the grid a more formidable obstacle. For example, small anti-personnel explosives can be placed at the bottom of the pit, or they may be hung along the top of the metal grid. Electricity can be applied between the top of the grid and the razor wires below. Weak points can be built into the metal grid so that they will break when someone walks on top of them. A weak and light cover can be placed over the grid to camouflage it.

For prison applications, the grid could be placed around the perimeter of the prison to help prevent an escape. For military applications, the grid could be used around fortifications and could be camouflaged so that, in the event of an attack, the enemy foot soldier would be slowed down or trapped by the grid. At that point the enemy soldier could be taken out since he would be temporarily immobilized. If anti-personnel mines are used, they would kill anyone trying to cross the grid or destroy any device which might be used to cross over the grid.

This invention provides a horizontal anti-personnel security fence. An elongated trench surrounds an installation. Razor and barbed wire lies on the bottom of the trench. A metal grid covering the trench, has openings of about 3×3 feet. The trench is about 3 to about 5 feet deep, and is about 12 to about 24 feet across. The obstacle drops, traps and injures personnel attempting to breach the horizontal fence.

Preferably anti-personnel explosives are placed randomly in the bottom of the pit.

In one embodiment, anti-personnel explosive devices are suspended in the trench by hanging the devices along the metal grid.

An electrical potential between the grid and the wires along the bottom of the trench causes electrical injury and immobilizes a person's body bridging the grid and the wires below in the bottom of the trench.

Random weakened areas in the grid promote breaking of the grid when crossed by unauthorized personnel.

In one embodiment, the metal grid is loosely joined at intersections of the grid.

A metal grid obstacle personnel trap surrounds prisons and military fortifications. A continuous trench about 4 feet deep extends around a prison or fortification. First and second opposite vertical walls have metal plates on opposite sides of the trench, and anti-personnel wire at the bottom of the trench. A metal grid extends across the trench and covers the trench around the prison or fortification. The metal grid has square openings about 3 feet by about 3 feet, making it difficult to maintain a person's balance. A person is engaged by the wire within the trench, if the person falls from the grid.

A weak, light cover is placed over the grid to visually obscure the obstacle.

This invention provides the method of securing a perimeter of a prison or military fortification or the like, which includes digging an elongated trench around the prison or military fortification, placing anti-personnel wire within the trench, covering the trench with a metal grid and providing large openings in the grid about 3 feet by 3 feet.

Preferably weakened portions are provided in the grid for dropping a person crossing the grid into the trench and contacting the person with anti-personnel wire in the trench.

The preferred method further includes establishing an electrical potential between the grid and the wire in the trench for electrically injuring a person in contact with wire in the trench and thereby deterring persons from crossing the trench.

Preferably the method further includes covering the grid with a decorative cover, thereby visually obscuring the trench and grid.

Pitfalls, man traps or tiger traps are known, in which small steep walled and deep pits are dug across suspected trails. Some traps have sharpened spikes at the bottom intended to mortally injure a trapped animal or human. However, such pitfalls have never been suggested for tying together into a horizontal fence. None have had relatively shallow, but broad trenches. Use of pitfalls has been for surprise, not a known deterrent as in the present invention.

These and other and further objects and features of the invention are apparent in the disclosure, which includes the above and ongoing specification, with the claims, and the drawings.

DETAILED DESCRIPTION OF THE DRAWINGS

Figure 1:
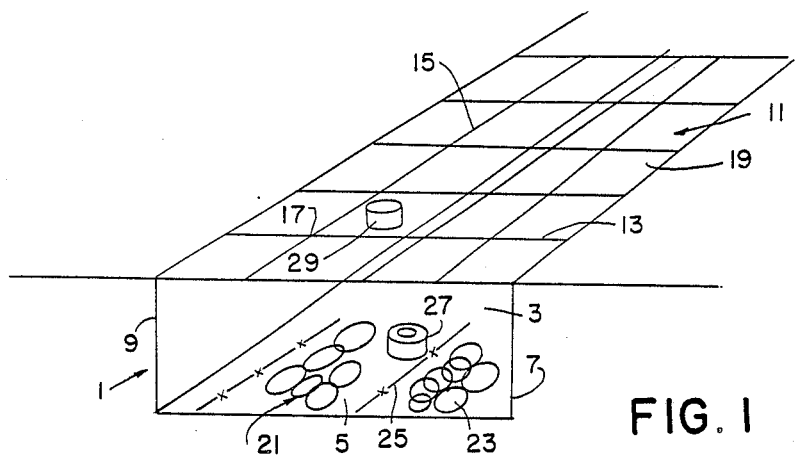
FIG. 1 is a perspective view of a grid-covered trench of the present invention.

Referring to FIG. 1, the metal grid obstacle trap of the present invention is generally indicated by the numeral 1. An elongated trench 3 with straight walls and a generally flat bottom 5 is dug along the perimeter of a prison or military base. Steel plates 7 and 9 are placed along side walls of the trench 3.

Steel grid 11 is laid over the pit 3. The steel grid is made of small diameter cross rods 13 and longitudinal rods 15 in a preferred embodiment. Intersections 17 of the rods may be spot welded.

Individual rods, sections of rods, or particular points on rods, or intersections of rods, may be weakened so that the rods will not support the weight of a person.

As shown in FIG. 1, the metal grid 11 has square openings 19 about 3 feet by 3 feet. Anti-personnel wire 21 is placed at the bottom 5 of trench 3. The wire may be barbed wire or razor wire in concertina form 23, or in straight, long, short or tangled pieces 25.

A person stepping on grid 11 will fall into the pit and will be injured and engaged by the wire 21. The fineness of the grid and the engagement by the wire makes it difficult to climb back onto the grid 11, and the person is held temporarily immobilized. Small anti-personnel explosive devices 27 positioned at the bottom of the trench 3 or suspended 29 by the grid deter attempts at crossing of the grid by personnel.

Figure 2:
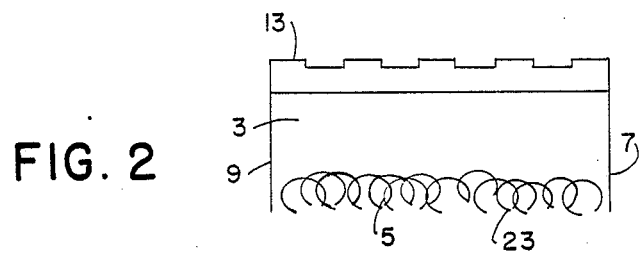
FIG. 2 is a side elevational view of the horizontal fence obstacle of the present invention.

As shown in FIG. 2, the entire bottom 5 of the trench 3 between steel plates 7 and 9 may be filled with concertina razor or barbed wire 23.

In the device shown in FIG. 2, the crossbars 13 of the grid 11 are made of vertically oriented metal plates.

Figure 3:
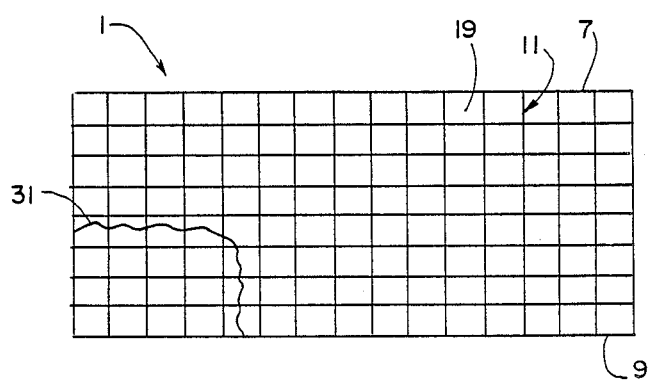
FIG. 3 is a top view of the horizontal fence.

As shown in FIG. 3, a large grid 11 with 3 feet by 3 feet openings 19 extends across a trench from one wall 7 to the opposite wall 9. The trench shown in FIG. 3 is approximately 24 feet wide. The trench extends entirely around the compound, which is protected by the horizontal fence.

For decorative purposes, part or all of the metal grid obstacle 1 may be covered with a lightweight decorative or camouflage material 31 to improve the landscape appearance of the installation, or to conceal the nature of the facility which is protected.

The metal grid obstacle of the present invention may be used alone or with other fences, for example, a low anti-vandal fence may surround the metal grid obstacle to prevent casual strollers from contacting the obstacle guard of the present invention.

In highly secure facilities, the metal grid obstacle guard of the present invention may be used between vertical fences of conventional design.

While the invention has been described with reference to specific embodiments, modifications and variations of the invention may be constructed without departing from the scope of the invention, which is described in the following claims.

I claim:

1. A horizontal anti-personnel security fence comprising an elongated trench surrounding an installation, anti-personnel wire at the bottom of the trench, a metal grid covering the trench, having openings of about 3×3 feet, the trench being to about 3 to about 5 feet deep, and being about 12 to about 24 feet across for dropping, trapping and injuring personnel attempting to breach the horizontal fence.

2. The apparatus of claim 1, further comprising anti-personnel explosives placed in the bottom of the pit.

3. The apparatus of claim 1, further comprising anti-personnel explosive devices suspended in the trench by hanging the devices along the metal grid.

4. The apparatus of claim 1, further comprising means for providing an electrical potential between the grid and the wires along the bottom of the trench for causing electrical injury to a person's body bridging the grid and the wires below in the bottom of the trench.

5. The apparatus of claim 1, further comprising random weakened areas in the grid for promoting breaking of the grid when crossed by unauthorized personnel.

6. The apparatus of claim 1, wherein the metal grid is loosely joined at intersections of the grid.

7. A metal grid obstacle personnel trap for surrounding prisons and military fortifications comprising a continuous trench about 4 feet deep extending around a prison or fortification, first and second opposite vertical walls on opposite sides of the trench, and anti-personnel wire at the bottom of the trench, a metal grid extending across the trench and covering the trench around the prison or fortification, the metal grid having square openings about 3 feet by about 3 feet for making it difficult to maintain a person's balance and for engaging the person by the wire within the trench if the person falls from th grid.

8. The apparatus of claim 6, further comprising anti-personnel explosives placed randomly in the bottom of the pit.

9. The apparatus of claim 6, further comprising anti-personnel explosive devices suspended in the trench by hanging the devices along the metal grid.

10. The apparatus of claim 6, further comprising means for providing an electrical potential between the grid and the wires along the bottom of the trench for causing electrical injury to a person's body bridging the grid and the wires below in the bottom of the trench.

11. The apparatus of claim 6, wherein a weak, light cover is placed over the grid to visually obscure the obstacle.

12. The apparatus of claim 7 wherein the anti-personnel wire is razor wire in concertina form.

13. The method of securing a perimeter of a prison or military fortification or the like, comprising digging an elongated trench around the prison or military fortification, placing anti-personnel wire within the trench, covering the trench with a metal grid and providing large openings in the grid about 3 feet by 3 feet.

14. The method of claim 13, wherein the providing of a grid comprises weakened portions in the grid for dropping a person crossing the grid into the trench and contacting the person with anti-personnel wire in the trench.

15. The method of claim 13, further comprising establishing an electrical potential between the grid and the wire in the trench for electrically injuring a person in contact with wire in the trench and thereby deterring persons from crossing the trench.

16. The method of claim 13, further comprising covering the grid with a decorative cover, thereby visually obscuring the trench and grid.

* * * * *